Sept. 18, 1951          H. LABHART          2,568,589
APPARATUS FOR DETERMINING THE COURSE OF THE REFRACTIVE
INDEX OF AN OPTICALLY NONHOMOGENEOUS MEDIUM DISPOSED
IN A CELL, PARTICULARLY AN ELECTROPHORESIS CELL
Filed Sept 8, 1948

INVENTOR
HEINRICH LABHART

BY *Young, Emery & Thompson*
ATTORNEYS

Patented Sept. 18, 1951

2,568,589

UNITED STATES PATENT OFFICE 2,568,589

APPARATUS FOR DETERMINING THE COURSE OF THE REFRACTIVE INDEX OF AN OPTICALLY NONHOMOGENEOUS MEDIUM DISPOSED IN A CELL, PARTICULARLY AN ELECTROPHORESIS CELL

Heinrich Labhart, Basel, Switzerland

Application September 8, 1948, Serial No. 48,286
In Switzerland September 16, 1947

3 Claims. (Cl. 88—14)

It is often desired to subject biological liquids or other solutions to quantitative electrophoretic investigation in smaller quantities than are practicable with the methods of measurement hitherto used. Most of these methods depend upon measuring the refractive index of the solution exposed to electrophoresis, and deducing the distribution of the concentration of the relevant substances in solution from the distribution of the refractive index.

When the substances are only available in very small quantities it is necessary to use an electrophoresis cell of very small dimensions in order to obtain a difference in the refractive index large enough to enable determinations to be carried out with the desired accuracy. For this purpose a process is required which enables the distribution of the refractive index to be measured with the necessary sensitivity in such cells.

It is known that the so-called interferometric method for determining the refractive index is one of the most sensitive of this kind. The interferometer first devised by Mach and Zehnder has for example been used for determining the distribution of the refractive index for flame gases (see for example H. Schardin, Zeitschrift für Instrumentenkunde, vol. 53, p. 396).

The Michelson interferometer can be used instead of the Mach and Zehnder interferometer. The former has the advantage that the light passes twice through the experimental cell and that the sensitivity with which the refractive index is determined is thus doubled.

A disadvantage both of the Mach and Zehnder interferometer and the Michelson interferometer is the great sensitivity of their adjustment, in that the system of interference fringes produced depends in a very sensitive manner on the respective positions of the plates and mirrors. The Jamin interferometer, which is also suitable for the present purpose, has only a small sensitivity of adjustment but the light passes only once through the experimental medium so that this interferometer lacks the above mentioned advantage of the Michelson interferometer.

The present invention provides an interferometer arrangement in which the light passes twice through the experimental medium, for example the contents of an electrophoresis cell, and which has only a small sensitivity of adjustment.

Figure 1:
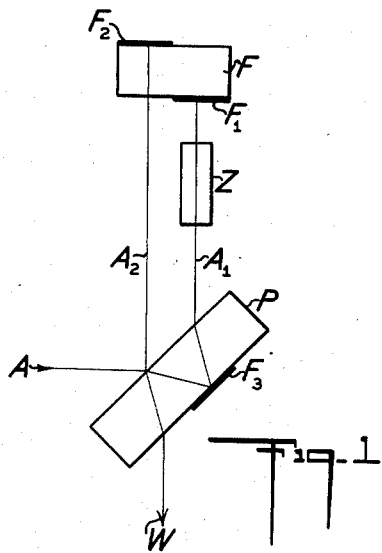
Figure 2:
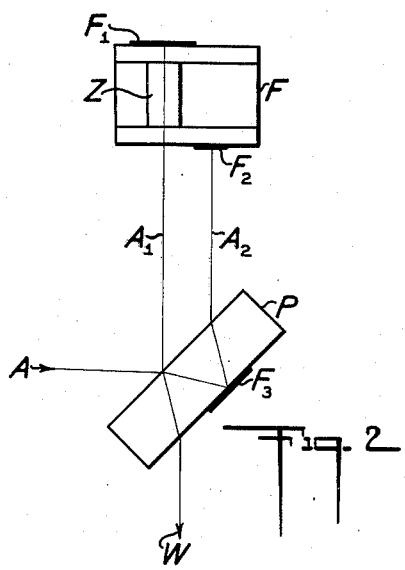

Two embodiments of the invention are illustrated diagrammatically in Figs. 1 and 2 of the accompanying drawings.

In the embodiment shown in Fig. 1, a stopped down pencil of rays A, coming from a monochromatic source of light, not shown, falls obliquely on a plane-parallel, transparent plate P where it is divided by reflection at the front and rear faces into two component beams $A_1$ and $A_2$. The beam $A_1$ passes through a cell Z containing the experimental medium and is reflected back along its path by the front face of a plane-parallel transparent plate F, and passes back through the cell to the place of incidence of the beam A on the plate P. The beam $A_2$ is reflected back along its path by the rear face of the plate F and likewise passes back to the place of incidence of the beam A on the plate P, where it is superposed on the beam $A_1$. The superposed beams pass in the direction W into a system of lenses, not shown, which in known manner throws an image of the cell Z for example on a photographic plate. The image of the cell Z bears interference fringes caused by the nonhomogenity of the experimental medium. From the spacing of the fringes the distribution of the refractive index in the cell can be determined in known manner.

The plate F is provided with a mirror coating at the places indicated by $F_1$ and $F_2$ and the plate P is provided with a mirror coating at the place indicated by $F_3$.

The optical thickness of the plate F is preferably so chosen that the component beams $A_1$ and $A_2$ travel at least approximately optically equivalent distances from the place where they are divided at the front face of the plate P until they are recombined at the same place so that their path difference after superposition is at least approximately zero. The source of light need not then be so strictly monochromatic.

The insensitivity to adjustment of this arrangement is due to the fact that each pair of reflecting faces are constituted by the front and rear faces of a plate, i. e. are rigidly connected.

In the embodiment shown in Fig. 2 in which the reference letters have the same significance as in Fig. 1, the plate F itself is formed as a cell which further simplifies the construction of the apparatus. In this modification the cell lies in the path of the beam $A_2$.

The device according to the invention for determining the distribution of the refractive index in non-homogeneous media thus consists in arranging in series behind one another a device for producing a mono-chromatic beam, a plane-parallel transparent plate arranged obliquely to this beam so as to divide the latter into two separate parallel beams, a cell for receiving the experimental medium disposed in the path of one of the separate beams, a second plane-parallel plate disposed perpendicular to the two separate beams, the front side of which plate reflects one of the separate beams and the rear side of which reflects the other of the separate beams, and an optical system for producing an image of the cell by means of the combined beam produced by superposition of the two separate beams on the first plane-parallel plate, whilst the second plane-parallel plate disposed perpendicularly to the two separate beams is preferably itself constructed as a cell for receiving the experimental medium, and the optical thickness of this plate is preferably so chosen that the path difference of the two separate beams is approximately zero after they have been superposed.

The beams A and W can of course be interchanged in the devices shown in Figs. 1 and 2. In that case monochromatic light would enter the plate P in the reverse direction in place of the combined beam indicated by W in the figures, and the emergent superposed beam, likewise passing in the reverse direction, would occupy the position of the beam indicated by A in the figures.

I claim:

1. Apparatus for analyzing solutions comprising a source of monochromatic light, a plane-parallel transparent plate arranged obliquely to the path of the beam of light emitted by said source, said plate dividing said beam into two parallel component beams, a rectangular cell in the path of one of said two parallel component beams for receiving the solution under investigation arranged at right angles to the said one of the component beams, a plate having two mirrors one on the front face and the other on the rear face, the front face mirror reflecting one and the rear face mirror the other of said component beams so that said component beams take each the same way back to said plane-parallel transparent plate where they are superposed again to form a combined beam, and a lens system forming a real image of said cell on a photographic plate by means of said combined beam.

2. Apparatus according to claim 1, wherein the optical thickness of said plane-parallel transparent plate and of said second-mentioned plate are chosen so as to make the path difference of said two component beams at their superposition on said plate approximately zero.

3. Apparatus according to claim 1, in which the second-mentioned plate is composed of two spaced parallel plates having the cell arranged directly with and between said two spaced plates.

HEINRICH LABHART.

REFERENCES CITED

The following references are of record in the file of this patent:

UNITED STATES PATENTS

| Number | Name | Date |
|---|---|---|
| 1,770,355 | Doi | July 8, 1930 |
| 2,256,804 | Hurley | Sept. 23, 1941 |
| 2,286,621 | Hurley | June 16, 1942 |
| 2,425,758 | Saunders | Aug. 19, 1947 |

FOREIGN PATENTS

| Number | Country | Date |
|---|---|---|
| 355,911 | Great Britain | Sept. 3, 1931 |
| 386,315 | Great Britain | Jan. 12, 1933 |
| 595,211 | Germany | Apr. 12, 1934 |

OTHER REFERENCES

Preston: Theory of Light, 2d edition, 1895, pages 196 to 198, published by MacMillan & Co., New York, New York.